(12) United States Patent
Hirschvogel et al.

(10) Patent No.: US 6,517,149 B2
(45) Date of Patent: Feb. 11, 2003

(54) MOTOR VEHICLE ROOF WITH A ROOF OPENING AND TWO COVERS

(75) Inventors: Engelbert Hirschvogel, Hofstetten (DE); Bernhard Wingen, Feldkirchen (DE); Günther Schwanitz, Weilheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/837,875

(22) Filed: Apr. 19, 2001

(65) Prior Publication Data

US 2002/0003357 A1 Jan. 10, 2002

(30) Foreign Application Priority Data

Apr. 19, 2000 (DE) .......................................... 100 19 677

(51) Int. Cl.⁷ .................................................. B60J 7/00
(52) U.S. Cl. .............. 296/214; 296/216.03; 296/220.01
(58) Field of Search ........................... 296/216.03, 214, 296/215, 220.01

(56) References Cited

U.S. PATENT DOCUMENTS

| 4,981,290 A | | 1/1991 | Huyer |
| 5,897,160 A | * | 4/1999 | Reihl et al. ............ 296/220.01 |
| 6,053,568 A | * | 4/2000 | Jambor .............. 296/220.01 X |

FOREIGN PATENT DOCUMENTS

| DE | 2636749 | * | 2/1978 | ................. 296/214 |
| DE | 195 38 552 C1 | | 4/1997 | |
| DE | 195 43 244 C2 | | 5/1997 | |

* cited by examiner

Primary Examiner—Dennis H. Pedder
(74) Attorney, Agent, or Firm—Nixon Peabody LLP; David S. Safran

(57) ABSTRACT

A motor vehicle roof with a roof opening formed in a fixed roof skin with two transparent successive displaceable covers for closing and at least partially clearing the roof opening, the two covers being raisable at a rear edge into a rear spoiler position. In order to increase the comfort of the passengers, an extendible sunshade unit is supported underneath each cover and can be moved with the respective cover, so that each cover can be at least partially covered by the extendible sunshade unit in the spoiler position.

9 Claims, 1 Drawing Sheet

MOTOR VEHICLE ROOF WITH A ROOF OPENING AND TWO COVERS

BACKGROUND OF THE INVENTION

1. Field of the Invention

The invention relates to a motor vehicle roof comprising a roof opening formed in a fixed roof skin with two transparent successive adjustable covers for closing and at least partially clearing the roof opening, the two covers each have a rear edge which can be raised and the two covers can be pushed into a rear spoiler position, and extendible sunshade units which are located underneath the cover.

2. Description of the Related Art

German Patent No. DE 195 43 244 C2 discloses a motor vehicle roof with several movable transparent covers which can close and at least partially clear a roof opening. The covers can be moved to the rear on top of one another to completely open the roof opening in a spoiler position. Underneath at least one of the covers, there is a sunshade means in the form of a shade on the motor vehicle roof which can be actuated independently of the displacement motion of the corresponding cover. Underneath the roof opening, there can also be two shades in order to be able to individually adjust the light level in the front part and in the rear part of the roof opening. Thus, shading of the roof opening can be adjusted, but direct shading of the individual covers is not possible.

German Patent No. DE 195 38 552 C1 discloses a sunshade for a motor vehicle roof with a movable cover for closing or clearing a roof opening in which a pull-out shade is interchangeably supported laterally underneath the transparent cover. The sunshade means is provided for a motor vehicle roof with a cover and utilizes a detachable mounting for replacement of the shade, if necessary.

SUMMARY OF THE INVENTION

A primary object of the invention is to provide a motor vehicle roof which enables greater driving comfort for passengers in the motor vehicle interior.

The object is achieved in a motor vehicle roof where each cover supports a sunshade unit which can be moved with the respective cover, and that each cover in its spoiler position can be at least partially covered by its extendible sunshade unit. Thus, on each cover, independently of the other cover, sunshading can be selectively adjusted to the required extent. By direct attachment of the two sunshade units to the respective covers, the two sunshade units can also be moved in the extended state.

Advantageous embodiments of the invention are described below.

According to one preferred embodiment, each sunshade unit, which is formed especially as a shade, is supported in the area of the front edge of its cover. Then each cover in its spoiler position can be at least partially covered by t he extendible sunshade unit by simple manual operation. Motorized actuation is also possible.

Feasibly, the pull-out or extendible free end of the front sunshade unit can be attached to the front edge of the rear cover. Here, the front edge means the entire area on the front edge of the over and in the front section underneath the cover. In this arrangement, the front cover with its sunshade unit which is connected to the rear cover can be moved in its spoiler position. The sunshade unit moves at the same time and is extended or retracted.

Furthermore, it can be provided that the pull-out or extendible free end of the rear sunshade unit can be attached to the rear edge of the rear cover. Thus, a gap between the rear edge of the roof opening and the rear cover can be closed. Then, the rear cover with is sunshade unit which is connected to the rear edge of the roof opening can be moved in its spoiler position. The sunshade unit is adjusted accordingly.

Preferably, each cover contains an edge-side inside cover sheet to which the sunshade unit can be attached.

Depending on the desired degree of shading, the shade material can be transparent, perforated or opaque.

In the following, one embodiment of the vehicle roof is explained in detail with reference to the accompanying drawings.

DETAILED DESCRIPTION OF THE DRAWINGS

Figure 1:
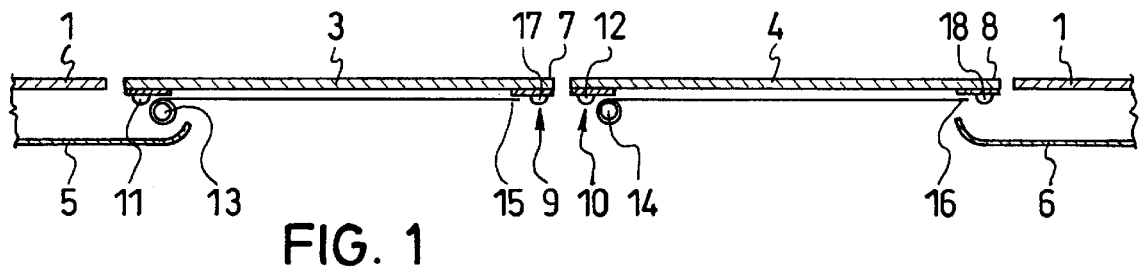
FIG. 1 shows a schematic lengthwise section of a motor vehicle roof with a roof opening which can be closed by two movable covers and with sunshade units which are attached to the covers.

The motor vehicle roof of a passenger car with a fixed roof skin 1 contains a roof opening 2 which can be closed with two covers 3, 4 which can be opened and which are located on two guides (not shown) in succession. Towards the motor vehicle interior, the roof opening 2 is bordered by a front headliner part 5 and a rear headliner part 6. Each cover 3, 4 can be raised or swung up at its rear edge 7 and 8 into a spoiler position. The rear cover 4 can be moved in its spoiler position along the guides to the rear over the roof skin 1 (see FIG. 2). The front cover 3 can be moved in its spoiler position along the guides over the rear cover 4 in its closed position in the roof opening 2 or in its spoiler position (see FIG. 2).

Figure 2:
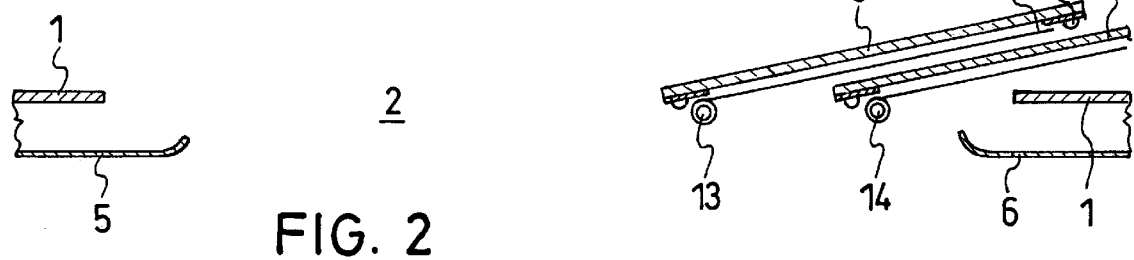
FIG. 2 shows the motor vehicle roof of FIG. 1 with the covers pushed to the rear.

The covers 3, 4 are made as glass covers and contain an inside cover sheet 9, 10 which is attached on the bottom and which is made as a peripheral, edge-side profile. Each cover 3, 4 contains a sunshade unit 13, 14 which, in the illustrated embodiment, is a shade which is attached to the front section 11, 12 of the respective inside cover sheet 9, 10. Each shade 13, 14 can be opened out of its rolled-up position by pulling on its free end 15, 16. The free end 15, 16 is pulled as far as a rear section 17, 18 of the inside cover sheet 9, 10 and is attached thereto so that each cover 3, 4 can be completely covered from the inside. However, intermediate positions can also be achieved by fixing lateral journals on the front free end 15, 16 in the corresponding locks on the opposite side sections of the inside cover sheets 9, 10. The sunshade units or shades 13, 14 can selectively assume these different positions when one or both covers 3, 4 are moved in the above described manner. FIG. 2 shows the opened roof opening 2 with the covers 3, 4 moved to the rear and the shades 13, 14 opened on the covers 3, 4.

Figure 3:
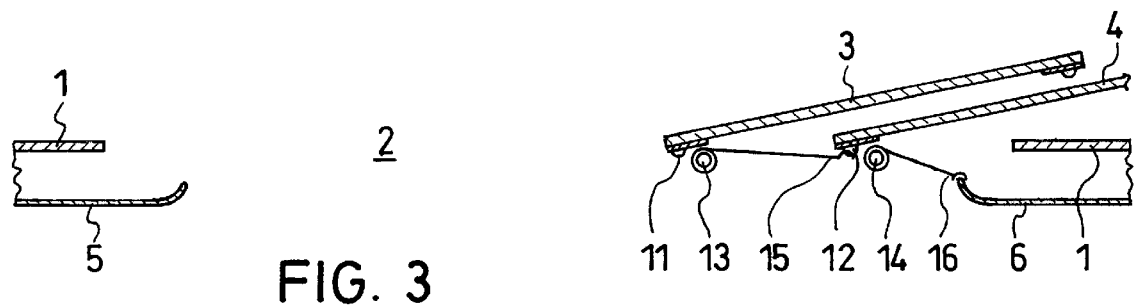
FIG. 3 shows the motor vehicle roof of FIG. 1 with the covers pushed to the rear and the sunshade units extended to different degrees.

FIG. 3 shows a modified mode of operation of the two sunshade units or shades 13, 14. The free end 16 of the rear shade 14 is hooked or fixed on the rear headliner part 6 and the free end 15 of the front shade 13 is hooked or fixed in the area of the front edge of the rear cover 14, for example, on the front section 12 of the inside cover sheet 10 of the rear cover 14. Thus, there is continuous sunshading from the rear headliner part 6 to the front edge of the front cover 3 or to the front section 11 of the inside cover sheet 9. This continuous sunshading is also preserved when the front cover 3 is moved since then the front shade 13 is further unwound and opened when the distance from the front cover 3 to the rear cover 4 increases. When the shade 13 is long enough, the front cover 3 can be moved into its closed position in the roof opening (see FIG. 1), and the shade 13 can extend to the rear cover 4 which is still in its spoiler position. The rear cover 4 can be moved equally, then on the one hand the rear shade 14 being pulled out and the front shade 13 being accordingly wound up again.

Sunshading can also be produced in such a way that one of the shades 13, 14 is moved on its cover 3, 4 into a completely or partially closed position, while the other shade 14, 13 is attached on the rear headliner part 6 or on the rear cover 4, as is described above.

The sunshade means or the shades 13, 14 can be manually actuated, for example with respect to the winding spring of the shades, and can be fixed on the respective attachment points, or the sunshade means can be extended or retracted by drive means (not shown).

In the described embodiment, the sunshade means are especially shades 13, 14. However, instead of pull-out shades with a continuous tarpaulin, also awnings, louver-like sunshade elements or the like can be used.

The covers 3, 4 can also be produced from transparent plastic.

What is claimed is:

1. A motor vehicle roof comprising:

a roof opening formed in a fixed roof skin, successive transparent displaceable front and rear covers for closing and at least partially clearing the roof opening, the front and rear covers having respective front edges and respective rear edges, and being raisable into a rear spoiler position by raising of the covers at the respective rear edge thereof, and extendible front and rear sunshade units located underneath a respective one of the front and rear covers, wherein the front and rear covers support the sunshade units, wherein the sunshade units are movable with respect to the front and rear covers, and wherein each of the sunshade units is operative to at least partially cover the respective one of the front and rear covers in the spoiler position, the front sunshade unit having an extendible free end that is attachable to the front edge of the rear cover.

2. The motor vehicle roof as claimed in claim 1, wherein each sunshade unit are movable in an opening direction from the front edge of the respective one of the front and rear covers towards the rear edge of the respective one of the front and rear covers.

3. The motor vehicle roof as claimed in claim 1, wherein each cover comprises an inside cover sheet with an edge profile to which the sunshade unit is attached.

4. The motor vehicle roof as claimed in claim 1, wherein the front cover is movable in the spoiler position, and wherein the front sunshade unit is connected to the rear cover.

5. The motor vehicle roof as claimed in claim 1, wherein the rear sunshade unit has an extendible free end that is attached to a rear edge of the roof opening.

6. The motor vehicle roof as claimed in claim 5, wherein the rear cover is movable in the spoiler position, and wherein the rear sunshade unit is connected to the rear edge of the roof opening.

7. The motor vehicle roof as claimed in claim 1, wherein the sunshade units comprise shades which can be wound and unwound.

8. The motor vehicle roof as claimed in claim 7, wherein the sunshade units are shades produced from a material selected from the group consisting of transparent and opaque materials.

9. The motor vehicle roof as claimed in claim 7, wherein the sunshade units are shades, each of which is supported on a bottom side of the respective cover in an area of the respective front edge.

* * * * *